United States Patent [19]

Terry

[11] Patent Number: 5,043,876

[45] Date of Patent: Aug. 27, 1991

[54] N-LEVEL FILE SHADOWING AND RECOVERY IN A SHARED FILE SYSTEM

[75] Inventor: Charles R. Terry, Endwell, N.Y.

[73] Assignee: International Business Machines Corporation, Armonk, N.Y.

[21] Appl. No.: 199,437

[22] Filed: May 27, 1988

[51] Int. Cl.$^5$ ............................................. G06F 15/40
[52] U.S. Cl. ............................. 364/200; 364/222.82; 364/266.5
[58] Field of Search ............................... 364/200, 900

[56] References Cited

U.S. PATENT DOCUMENTS

| | | | |
|---|---|---|---|
| 4,399,504 | 8/1983 | Obermarck et al. | 364/200 |
| 4,400,773 | 8/1983 | Brown et al. | 364/200 |
| 4,432,057 | 2/1984 | Daniell et al. | 364/300 |
| 4,480,304 | 10/1984 | Carr et al. | 364/200 |
| 4,498,145 | 2/1985 | Baker et al. | 364/900 |
| 4,558,413 | 12/1985 | Schmidt et al. | 364/300 |
| 4,627,019 | 12/1986 | Ng | 364/900 |
| 4,646,229 | 2/1987 | Boyle | 364/200 |
| 4,648,036 | 3/1987 | Gallant | 364/300 |
| 4,714,992 | 12/1987 | Gladney et al. | 364/200 |
| 4,716,528 | 12/1987 | Crus et al. | 364/300 |
| 4,823,310 | 4/1989 | Grand | 364/900 |
| 4,853,843 | 8/1989 | Ecklund | 364/200 |
| 4,875,159 | 10/1989 | Cary et al. | 364/200 |
| 4,914,569 | 4/1990 | Levine et al. | 364/200 |

FOREIGN PATENT DOCUMENTS 8400426 2/1984 PCT Int'l Appl. .

OTHER PUBLICATIONS

Carey, J. J., "Improving the Performance of an Optimistic Concurrency Control Algorithm Through Timestampe & Versions", Jun. 1987, IEEE Transactions on Software Engineering, vol. SE-13, No. 6.
IBM Tech. Disclosure Bull., vol. 28, No. 3, Aug. 1985, A. M. Herzik et al., pp. 942 to 947.

Primary Examiner—Lawrence E. Anderson
Attorney, Agent, or Firm—Whitham & Marhoefer

[57] ABSTRACT

A shared file environment permits multiple users to read a file that is being updated concurrently. The process maintains N level shadows for a file to allow multiple users to read a file even though that file may be updated by one or more updaters in succession. A reader of a file does not need to wait on an updater of the file nor does the reader see any updates as they are being made. Each reader that opens the file sees the latest committed level of the file; that is, if reader A opens the file for read before updater B commits his changes, then there will exist one level shadow for the file after B commits. The process maintains N level shadows for a file, although only one updater of a file is allowed at a time. A new construct, referred to as the Not Available Yet (NAY) structure, contains entries for all files that are currently open for read. The NAY structure has an entry for each level of a file that is open for read. A counter associated with the entry indicates the number of readers of that level of the file. These entries are anchors for a list of block numbers of shadow blocks that cannot be unallocated because there is at least one reader of that level. A logging procedure allocates and unallocates blocks to track the N-level shadow blocks.

2 Claims, 3 Drawing Sheets

N-LEVEL FILE SHADOWING AND RECOVERY IN A SHARED FILE SYSTEM

DESCRIPTION

Background of the Invention

1. Field of the Invention

The present invention generally relates to improvements in data processing systems supporting shared files and, more particularly, to a process which allows direct and immediate access of a file by one or more readers while the file is being updated by an updater.

2. Description of the Prior Art

In large data processing systems running a data base application program there are typically multiple users which are simultaneously accessing files of the data base. Moreover, a single file of the data base may be simultaneously accessed by more than one user. Such multiple access of a single file is permitted where each of the users are merely reading the file. There is a problem, however, where one of the users accesses the file for purposes of editing or updating the file. In such a case, the updater locks out other users until the update is completed or committed. This can cause significant delays to those users who need to access the file to perform a read operation.

In such a shared file environment, it is desirable that multiple users be permitted to read a file that is being updated concurrently. The readers should not have to wait on the updater of the file nor should they see any updates being made until the unit of work containing the updates is committed. Thus, each reader that opens a file would see the latest committed level of the file.

SUMMARY OF THE INVENTION

It is therefore an object of the present invention to provide a shared file environment in which multiple users may read a file that is being updated concurrently.

It is a further object of the invention to provide a process for maintaining N level shadows for a file to allow multiple users to read a file even though that file may be updated by one or more updaters in succession.

According to the invention, a reader of a file does not need to wait on an updater of the file nor does the reader see any updates as they are being made. Each reader that opens the file will see the latest committed level of the file; that is, if reader A opens the file for read before updater B commits his changes, then there will exist one level shadow for the file after B commits. Further, the invention contemplates a process of maintaining N level shadows for a file, although in the preferred implementation of the invention, only one updater of a file is allowed at a time.

The invention introduces a new construct, referred to as the Not Available Yet (NAY) structure, which contains entries for all files that are currently open for read. More particularly, the NAY structure has an entry for each level of a file that is open for read. A counter associated with the entry indicates the number of readers of that level of the file. These entries are anchors for a list of block numbers of shadow blocks that cannot be unallocated because there is at least one reader of that level. The invention contemplates a logging procedure of allocation and unallocation of blocks to track the N-level shadow blocks.

BRIEF DESCRIPTION OF THE DRAWINGS

The foregoing and other objects, aspects and advantages of the invention will be better understood from the following detailed description of a preferred embodiment of the invention with reference to the drawings, in which.

DESCRIPTION OF THE PREFERRED EMBODIMENT OF THE INVENTION

In order to describe the method used to achieve N-level file shadowing according to the invention, some constructs used within the shared file system must be described.

Figure 1:
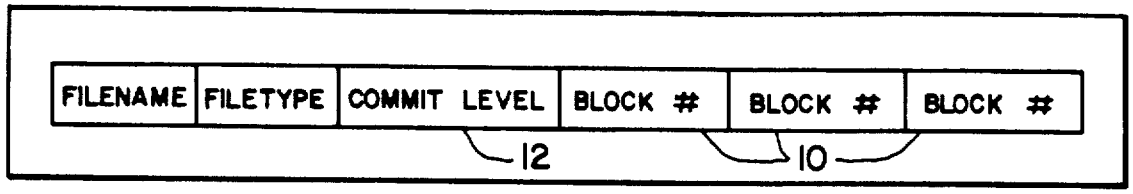
FIG. 1 is a block diagram showing the form of description of a file in an entry in a Shared File System catalog called OBJECTCAT.

The description of a file exists in a shared file system catalog called OBJECTCAT. An OBJECTCAT entry is illustrated in FIG. 1, and there is an entry of this type for each file that exists in the shared file system. Within the entry are the block numbers 10 on disk where the file data resides. The block numbers are an internal referencing mechanism used to locate a 4K block on a given physical direct access storage device (DASD) managed by the shared file system. This mechanism is not relevant to the subject invention but is conventional and, therefore, is not described. The block numbers within an entry for a file are stored in logical file block sequence; that is, the first entry corresponds to the first block of the file, the second entry corresponds to the second block, and so on.

When a unit of work updates a file, those file blocks are not updated in place. Instead, another block is allocated to contain the updates. The original blocks of the file are referred to as shadow blocks. When the updater commits his changes, the shadow blocks are unallocated and the OBJECTCAT entry is updated to reflect the updated block numbers.

Associated with the file entry in OBJECTCAT is a commit level 12 for the file. This contains the latest committed level of the file; that is, each time the file is updated, the commit level of the file is incremented during commit processing.

Figure 2:
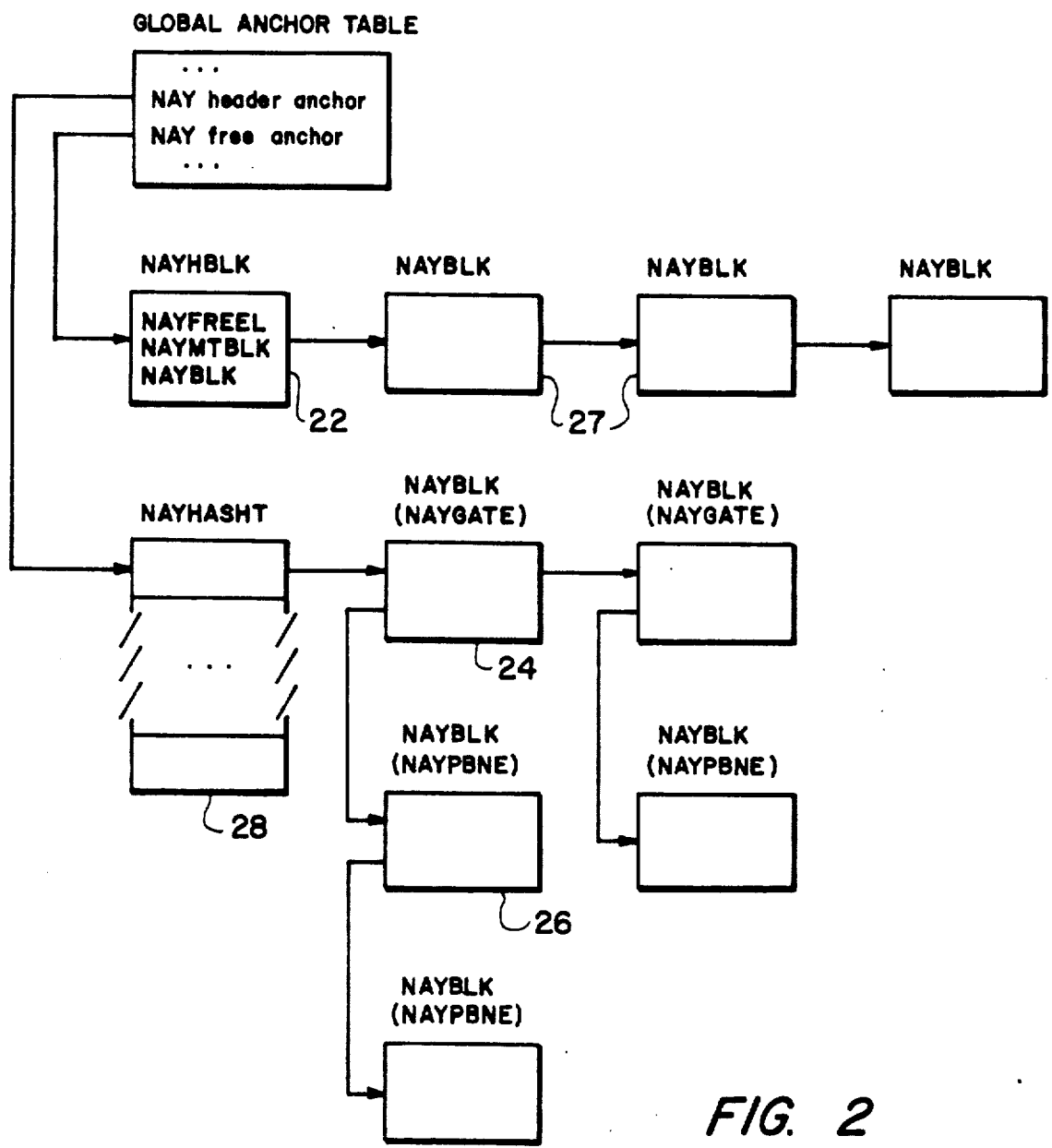
FIG. 2 block diagram showing the Not Available Yet (NAY) construct.

A Not Available Yet (NAY) structure, illustrated in FIG. 2, contains entries for all files that are currently open for read. It actually has an entry for each level of a file that is open for read. There is a counter associated with the entry to indicate the number of readers of that level of the file. These entries are anchors for a list of block numbers of shadow blocks that cannot be unallocated because there is at least one reader of that level.

The NAY structure illustrated in FIG. 2 consists of a set of equal size control blocks that can be one of the following:

1. A NAY header block (NAYHBLK) 22.
2. A NAYGATE 24 which identifies the file/commit level that is currently opened for read, or 3. A NAYPBNE 26 which contains the physical block number of the block that has been modified by an updater but is still being read by this reader.

There is only one NAYHBLK 22. This control block is the anchor for a free queue of unused NAY blocks (NAYBLKs) 27. There is also a hash table (NAYHASHT) 28 which optimizes access to the NAY structure when searching for a file that is open for read.

The recovery process consists of logging block allocations and unallocations. The user data of the file is not logged. Allocations are logged as they occur, but the unallocations are logged as part of the commit log record. This is done at that time to ensure that the blocks are available in case the work unit rolls back.

Also part of the recovery process is checkpoint. A checkpoint takes a snapshot of the system regardless of the state of the work units in progress. The fact that a checkpoint has been taken is recorded in the log. When the shared file system is restarted after shutdown, whether expected or unexpected, the system will appear as it did at the last checkpoint. The log is synchronized to that point via the checkpoint log record and recovery processing will begin from that point.

In order to maintain consistency of file data, a second block is allocated to contain updates to a file by a logical unit of work. When the updates are committed, the OBJECTCAT entry (see FIG. 1) for the file is updated with the block numbers containing the updates and the shadow block (the last committed picture of the block) is released. Also, the commit level for the file is incremented.

If the file was never shared by readers and updaters, then the processing would be quite simple. When the file is opened and the file blocks are retrieved, the block numbers to the data would be obtained from the OBJECTCAT entry, and the data read from DASD. When the file blocks are updated and written back, second blocks are allocated for the updated file blocks, and those block numbers replace the corresponding OBJECTCAT entries. But things are not simple in the shared environment.

When a file is opened for read, a copy of the OBJECTCAT entry for the file is cached. Also, an entry is made in the new construct called the Not Available Yet (NAY) structure, shown in FIG. 2, indicating that this level of the file has been opened for read. An updater of a file also has a copy of the OBJECTCAT entry cached but no entry is made in the NAY structure. Now the system has a record of all readers of any level of any file. It uses this list to maintain that level of the file until all readers of that level have closed the file.

The updater of the latest level (always the latest because there can be only one updater at a time) commits the updates, the OBJECTCAT entry for the file will be updated to reflect the new block numbers containing the updates and the commit level of the file will be incremented. The commit process will check to see if there are any readers of the prior level of the file by interrogating the NAY structure. If there are readers of that level, the shadow blocks (the previous version) will be chained from the NAY entry for that file level and not released at this time. When the last reader of the file closes, the close processing will delete the NAY structure entry for this level of the file and if there are any blocks chained from the entry, it will unallocate them.

It should be mentioned that blocks that are allocated and unallocated are logged in the shared file system log as part of the logging performed for the unit of work. New block allocations are logged as new record types and block releases are logged as part of the commit log record. The reason for not releasing blocks until commit is to maintain file consistency in case the unit of work rolls back. Otherwise, the blocks may be allocated to other updated files. If the unit of work does roll back, the newly allocated blocks are released (by reading the log) and the shadow blocks are left allocated.

Another consideration to be made is the interaction with multiple levels of a file and the shared file system checkpoint process. As stated in the description of the recovery process, a checkpoint takes a snapshot of the system regardless of any units of work in progress. Now we do not want to record the fact that there are blocks still allocated due to readers of a file as those readers will not exist after restart and there would be no way to unallocate those blocks. Thus, the checkpoint process will interrogate the NAY structure and record in its picture that these blocks are unallocated.

Another new construct that is employed in this process is a list of block numbers that have been released due to updates. These lists are anchored from a table containing entries for each file and level updated by the unit of work. Thus, for each block unallocated for any file being updated by the unit of work, the table is scanned for the proper file entry and the block number is added to the appropriate list. This centralized all the blocks to be released for efficient processing by the commit process.

Figure 3:
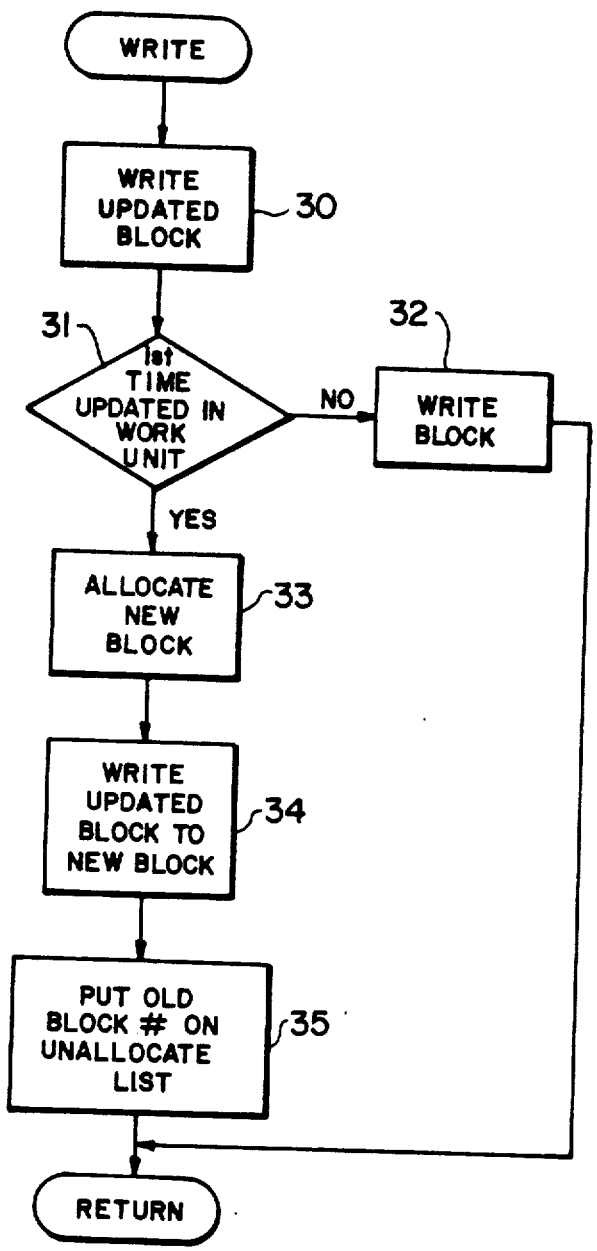
FIG. 3 is a flow diagram showing the logic of the block allocation/unallocation process according to the invention.
Figure 5:
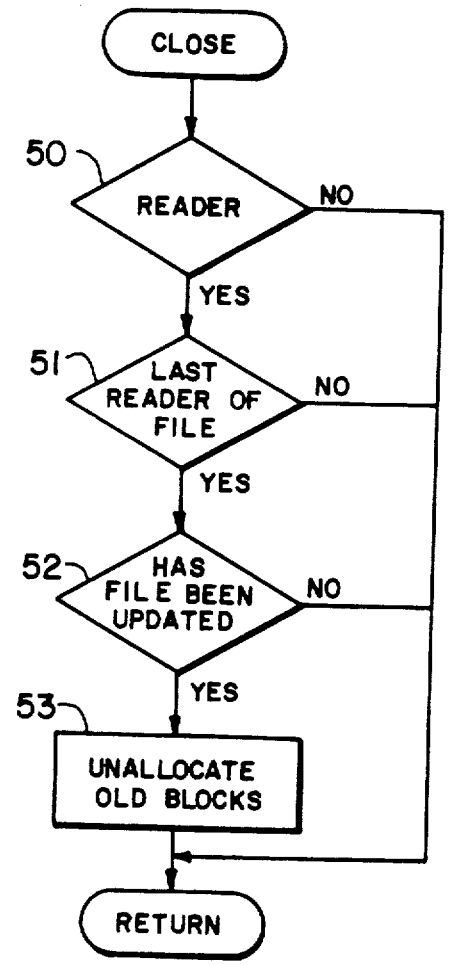
FIG. 5 is a flow diagram showing the logic of the close process according to the invention.
Figure 4:
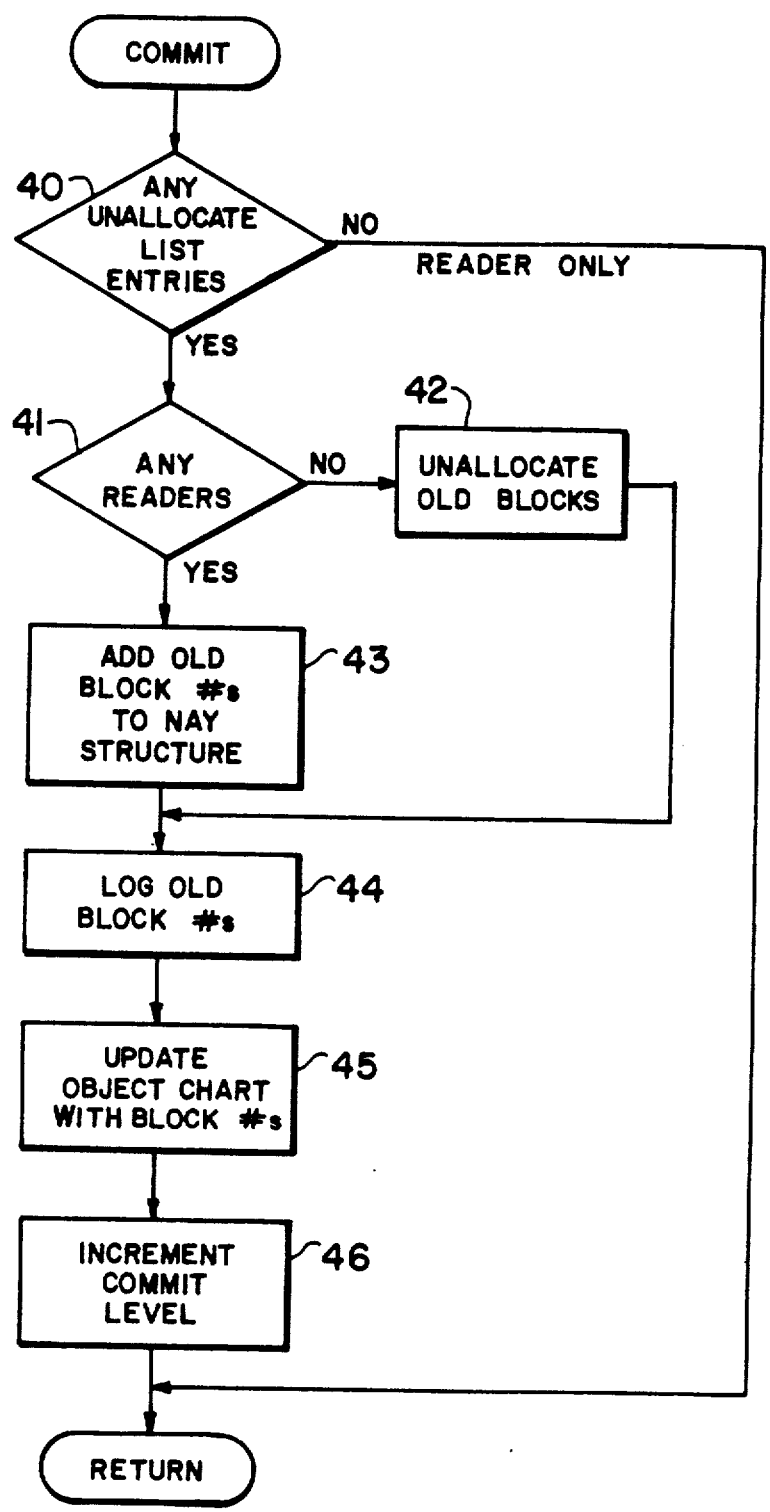
FIG. 4 is a flow diagram showing the logic of the commit process according to the invention.

The logic of the processes described are illustrated in the flow diagrams of FIGS. 3, 4 and 5. Beginning with FIG. 3, the block allocation/unallocation process begins by writing an updated block in function block 30. A test is made in decision block 31 to determine if this is the first time this block has been updated. If not, the updated block is written in function block 32 and the process ends. However, if this is the first time the block is updated, then a new block is allocated in function block 33. The updated block is written to the new block in function block 34, and then the old block number is entered on the unallocated list in function block 35 before the process ends.

FIG. 4 shows the commit process which begins by making a test in decision block 40 to determine if there are any unallocated list entries. If not, the user is determined to be a reader only, and the process ends. Assuming that there are unallocated list entries, a test is made in decision block 41 to determine if there are any readers. If not, the old blocks are unallocated in function block 42 and control goes to function block 44; otherwise, old block numbers are added to the NAY structure in function block 43 before control goes to function block 44. In function block 44, the old block numbers are logged. Then, in function block 45, OBJECTCAT is updated with block numbers, and in function block 46, the commit level is incremented before the process ends.

The close process is illustrated in FIG. 5 and begins by testing in decision block 50 to determine if the user is a reader. If not, the process ends; otherwise, a test is made in decision block 51 to determine if the reader is the last reader of the file. If not, the process ends; otherwise, a test is made in decision block 52 to determine if the file has been updated. If not, the process ends; otherwise, the old blocks are unallocated in function block 53 before the process ends.

The following pseudocode, written in Program Design Language (PDL), implements the detailed logic illustrated in the flow diagrams of FIGS. 3, 4 and 5 required to maintain the N-level shadowing according to the invention. A programmer skilled in the art can write source code from the pseudocode in any programming language, such as Pascal or C, from which object code may be derived by a suitable compiler.

```
OPEN FOR READ PROCESSING
    Hash FILEID and COMMIT LEVEL for the file
    If NAYHASHT entry = EMPTY, Then
    Do
        Acquire NAYBLOCK from NAYFREEL (freelist)
        Build NAYGATE consisting of FILEID/COMMIT
        LEVEL
        Chain to NAYHASHT entry
    End
    Else
    Do
        Scan NAYGATES chained from NAYHASHT entry
        If NAYGATE for FILEID/COMMIT LEVEL not
        found, Then
        Do
            Acquire NAYBLOCK from NAYHASHT entry
            Build NAYGATE consisting of FILEID/COMMIT
            LEVEL
            Chain to NAYHASHT entry
        End
        Else (NAYGATE found)
            Increment open count in NAYGATE
    End
WRITE BLOCK PROCESSING
    If the block is being updated for the first
    time in this unit of work, Then
    Do
        Allocate a new block to contain updates
        Log block number
        Add old block number to UNALLOCATE LIST (to
        be unallocated at COMMIT)
        Store the newly allocated block number in
        the cached OBJECTCAT for the file to be
        updated at COMMIT
    End
Note: The UNALLOCATE LIST is organized by FILEID/
COMMIT LEVEL. Block numbers are chained to their
appropriate file entry.
CLOSE FOR READ PROCESSING
    Decrement open count in NAYGATE
    If open count = 0, Then
    Do
        Unallocate blocks chained to NAYGATE
        Return NAYBLOCKs to NAYFREEL (freelist)
    End
COMMIT PROCESSING
    For each file entry in the UNALLOCATE LIST
    Do
        Hash FILEID and COMMIT LEVEL
        If NAYHASHT entry = empty, Then (case for
        no readers)
        Do
            Unallocate blocks in UNALLOCATE LIST
            entry
        End
        Else
        Do for each update block
            Acquire a NAYBLOCK of NAYFREEL (freelist)
            for NAYPBNE
            Store block number in the NAYPBNE
            Chain off NAYGATE
```

```
-continued
        End
        Log block numbers in COMMIT log record
        Update OBJECTCAT for this file with new
        block numbers and increment commit level
        (so new readers will see updates)
    End
CHECKPOINT PROCESSING
    Scan NAY structure
    For each NAYPBNE
    Do
        Unallocate block in checkpointed copy of
        block allocation map
    End
```

While the invention has been described in terms of a single preferred embodiment, those skilled in the art will recognize that the invention can be practiced with modification within the spirit and scope of the appended claims.

Having thus described my invention, what I claim as novel and desire to secure by Letters Patent is as follows:

1. In a data processing system supporting a shared file environment in which multiple users may read a file stored in the system concurrently while the file is being updated, the method of N-level file shadowing comprising the steps of:

making an entry in a data structure indicating a current level of a file when the file is opened for read by one of said users, said step of making an entry in a data structure generating a record of all readers of any level of the file;

allocating a data block for the current level of the file for reading when the current level of the file is first opened for read by one of said users, an allocated data block for reading the file being referred to as a "shadow" block;

determining from said data structure whether there are any readers of a prior level of the file and, if there are such readers, chaining shadow blocks for each prior level to maintain N levels of the file in shadow blocks;

allocating a data block to contain updates to the file by an updater when a file is opened for write by the updater;

performing checkpoints of a current status of the shared file environment and recording said checkpoints in a checkpoint log, said checkpoints serving as snapshots of the system;

restarting the data processing system after a shutdown by accessing the checkpoint log and performing recovery processing so that the system appears as it did after a last checkpoint before the shutdown.

2. The method of claim 1, further comprising the steps of:

logging said allocation of said data block; committing updates by said updater; and then logging said allocation of said shadow blocks.

* * * * *